US012798779B2

(12) United States Patent
Bartosz et al.

(10) Patent No.: US 12,798,779 B2
(45) Date of Patent: Nov. 17, 2026

(54) CABIN OCCUPANCY SENSOR FOR AIRCRAFT ECS

(71) Applicant: Hamilton Sundstrand Corporation, Charlotte, NC (US)

(72) Inventors: Lance R. Bartosz, Granby, MA (US); Matthew L. Pess, West Hartford, CT (US); Mark B. Dowty, Rural Hall, NC (US)

(73) Assignee: Hamilton Sundstrand Corporation, Charlotte, NC (US)

(*) Notice: Subject to any disclaimer, the term of this patent is extended or adjusted under 35 U.S.C. 154(b) by 494 days.

(21) Appl. No.: 18/479,519

(22) Filed: Oct. 2, 2023

(65) Prior Publication Data

US 2025/0108925 A1 Apr. 3, 2025

(51) Int. Cl.
*B64D 13/08* (2006.01)
*B64D 13/06* (2006.01)

(52) U.S. Cl.
CPC ...... *B64D 13/08* (2013.01); *B64D 2013/0625* (2013.01); *B64D 2013/0688* (2013.01)

(58) Field of Classification Search
CPC ............ B64D 13/08; B64D 2013/0625; B64D 2013/0688
USPC ............................................................ 454/76
See application file for complete search history.

(56) References Cited

U.S. PATENT DOCUMENTS 6,454,178 B1 9/2002 Fusco et al.
7,837,541 B2 * 11/2010 Gray ...................... B64D 13/04 454/71
9,102,215 B2 * 8/2015 Kumar ............... B60H 1/00842
9,302,781 B2 * 4/2016 Jouper ................... B64D 11/06
9,889,939 B2 * 2/2018 Zhang .................... B64D 13/08
9,896,216 B2 2/2018 Linert et al.
10,414,505 B2 9/2019 Franco et al.
11,059,593 B2 7/2021 Fagundes et al.
11,577,814 B2 2/2023 Santiago et al.
(Continued)

FOREIGN PATENT DOCUMENTS

JP 4341142 B2 10/2009
WO 2021263094 A1 12/2021

OTHER PUBLICATIONS

Communication Pur4suant to Article 94(3) EPC dated Jan. 22, 2026, for corresponding European Patent Application No. 24204054.1-1009, 7 pgs.
(Continued)

*Primary Examiner* — Avinash A Savani
*Assistant Examiner* — Dana K Tighe
(74) *Attorney, Agent, or Firm* — Kinney & Lange, P.A.

(57) ABSTRACT

A method is disclosed for controlling an atmosphere within an aircraft. The method includes sensing, by at least one cabin occupancy sensor, a number of empty seats within a cabin of the aircraft. Data representative of the number of empty seats from the at least one cabin occupancy sensor is communicated by the at least one cabin occupancy sensor to an electronic controller. The electronic controller is in communication with a cabin air circulation system and an environmental control system. The electronic controller sends a flow command to the environmental control system and the cabin air circulation system to adjust a rate of an air inflow into the cabin based on the number of empty seats sensed by the at least one cabin occupancy sensor.

15 Claims, 7 Drawing Sheets

(56) References Cited

U.S. PATENT DOCUMENTS

| | | | | |
|---|---|---|---|---|
| 11,577,841 | B2 | 2/2023 | Quartarone et al. | |
| 2013/0231035 | A1* | 9/2013 | Desmarais | B64D 13/006 454/75 |
| 2021/0107662 | A1* | 4/2021 | Quartarone | B64D 13/06 |
| 2021/0394912 | A1* | 12/2021 | Krenz | H04N 5/33 |
| 2022/0194602 | A1 | 6/2022 | Le Cam et al. | |
| 2024/0017848 | A1* | 1/2024 | Fuchte | B64D 11/00 |

OTHER PUBLICATIONS

Extended European Search Report dated Mar. 24, 2025, for corresponding European Patent Application No. 24204054.1, 14, pgs.

Partial European Search Report dated Jan. 3, 2025, for corresponding European Patent Application No. 24204054.1, 22 pgs.

* cited by examiner

CABIN OCCUPANCY SENSOR FOR AIRCRAFT ECS

BACKGROUND

This disclosure relates generally to cabin air controller systems on aircraft and, more particularly, to ventilation and climate control on aircraft.

Pressurized aircraft have integrated air controller systems to provide a pressurized environment, fresh air transfer, recycling, heating, and air conditioning to maintain a comfortable, safe environment for occupants for extended periods of time. Inflow of aircraft cabin air is set to meet regulatory requirements for a fully loaded aircraft and cabin air controller systems typically do not allow variation of the inflow rate. Currently, the U.S. Federal Aviation Administration (FAA) prescribes that 0.25 kg (0.55 lb) of conditioned air per minute must be provided for each passenger. When an aircraft is partially loaded with passengers or cargo, typical cabin air controller systems provide an excess of inflow ventilation to the cabin which reduces operation efficiency. If the air controller system permits adjustment of the inflow rate, adjustments are entered manually by flight crews into the air controller system.

SUMMARY

In one example of the disclosure, a method is disclosed for controlling an atmosphere within an aircraft. The method includes sensing, by at least one cabin occupancy sensor, a number of empty seats within a cabin of the aircraft. Data representative of the number of empty seats from the at least one cabin occupancy sensor is communicated by the at least one cabin occupancy sensor to an electronic controller. The electronic controller is in communication with a cabin air circulation system and at least one environmental control system. The electronic controller sends a flow command to both the at least one environmental control system and the cabin air circulation system to adjust a rate of a total air inflow into the cabin based on the number of empty seats sensed by the at least one cabin occupancy sensor.

In another example of the disclosure, an air controller system for controlling an atmosphere within an aircraft includes a cabin air circulation system and at least one cabin occupancy sensor in a cabin of the aircraft. The at least one cabin occupancy sensor is configured to detect a number of empty seats within the cabin. An electronic controller is in communication with the cabin air circulation system and the at least one cabin occupancy sensor. The electronic controller is configured to receive data from the at least one cabin occupancy sensor representative of the number of empty seats detected by the cabin occupancy sensor. The electronic controller is also configured to send commands to the cabin air circulation system based on the number of empty seats detected by the cabin occupancy sensor.

A method is disclosed for controlling an atmosphere within an aircraft. The method includes sensing, by at least one cabin occupancy sensor, surface temperatures of passengers within a first zone of a cabin of the aircraft. The at least one cabin occupancy sensor communicates data representative of the surface temperatures of the passengers within the first zone to an electronic controller. The electronic controller is in communication with a first environmental control system. The electronic controller sends a first temperature command to the first environmental control system to adjust a temperature of a first air inflow into the first zone of the cabin based on the surface temperatures of the passengers within the first zone sensed by the at least one cabin occupancy sensor.

The present summary is provided only by way of example, and not limitation. Other aspects of the present disclosure will be appreciated in view of the entirety of the present disclosure, including the entire text, claims and accompanying figures.

Figure 1:
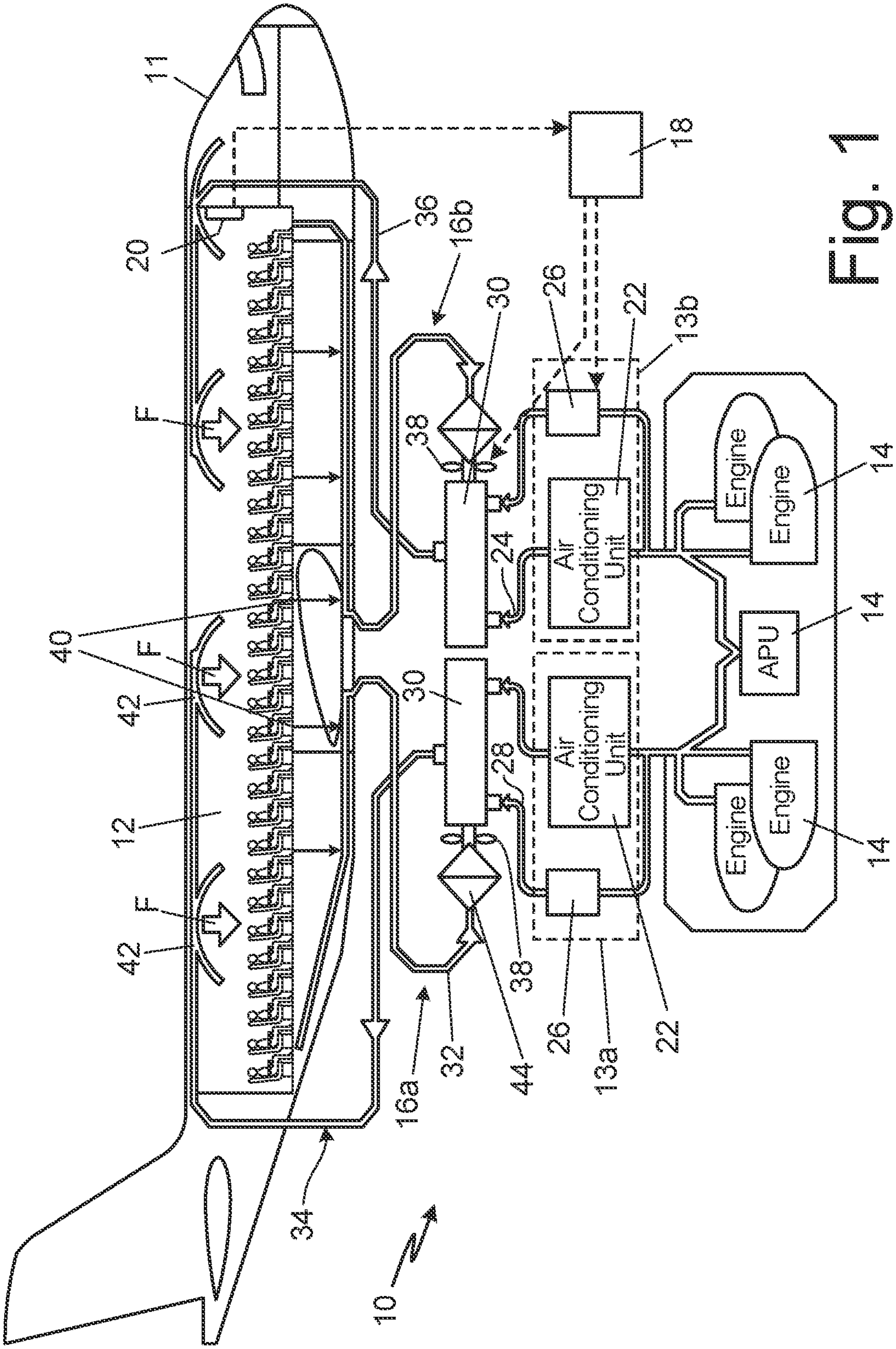
FIG. 1 is a partial schematic diagram of an aircraft air management system.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

An air controller system is disclosed that includes cabin occupancy sensors that detect empty seats in a cabin of an aircraft. The cabin occupancy sensors communicate the number of empty seats to a controller of the air controller system. The controller sends commands to a cabin air circulation system of the air controller system to adjust a rate of an inflow to the cabin that corresponds with the actual occupancy of the cabin. The cabin occupancy sensors can also optionally detect the distribution of the empty seats in the cabin of the aircraft to determine which zones of the cabin are more densely occupied or less densely occupied. The cabin occupancy sensors communicate the distribution of the empty seats to the controller of the air controller system. The controller communicates with an environmental control system of the air controller system to adjust a temperature of the inflow to each zone of the cabin that corresponds with the actual occupancy of the cabin. The air controller system is described in detail below with reference to FIGS. 1-8.

FIG. 1 is a partial schematic diagram of an example of air controller system 10 for controlling air within aircraft 11. Aircraft 11 includes a pressurized and conditioned area, such as cabin 12 in FIG. 1, that air controller system 10 controls.

Cabin 12 can be configured to house people, cargo, and the like therein. Air controller system 10 provides conditioned air to cabin 12 and removes used or contaminated air from cabin 12. As shown in the example of FIG. 1, air controller system 10 includes first environmental control system (ECS) 13*a*, second environmental control system (ECS) 13*b*, sources 14, first cabin air circulation system 16*a*, second cabin air circulation system 16*b*, controller 18, and cabin occupancy sensors 20. First ECS 13*a* and second ECS 13*b* can each include air conditioning units or packs 22, pack outlet ducts 24, hot air trim systems 26, and trim outlet ducts 28. First cabin air circulation system 16*a* and second cabin air circulation system 16*b* can each include air mixing units 30, return ducts 32, air distribution system 34 with one or more conduits 36, recirculation fan 38, cabin outlets 40, cabin vents 42, and filter 44. While air controller system 10 is illustrated and described herein with reference to aircraft 11, the systems and techniques discussed herein may be used for a variety of air controller systems 10. For example, cabin 12 may be replaced with any closed volume to be conditioned. As such, systems described herein may be used with ship air controller systems, such as submarines and cruise liners for example, personnel carrier air controller systems, bus, trolley, train, or subway air controller systems, or any other air controller system that requires a continual supply of conditioned air.

As shown in FIG. 1, a medium, such as air for example, is provided from one or more sources 14 to air controller system 10. Examples of suitable sources 14 include but are not limited to an engine of aircraft 11 and an auxiliary power unit of aircraft 11. The medium output from these sources 14 is provided to air conditioning units 22 of first ECS 13*a* and second ECS 13*b*. Within these air conditioning units 22, the medium is conditioned. This conditioning includes altering one or more of a pressure, temperature, humidity, or flow rate of the medium based on an operating condition of aircraft 11. The medium output or discharged from air conditioning units 22 of first ECS 13*a* and second ECS 13*b* may be used to maintain a target range of pressures, temperatures, and/or humidity within cabin 12. A portion of the medium from sources 14 can also be provided to hot air trim systems 26. The medium in hot air trim systems 26 is hotter than the medium discharged from air conditioning units 22. Hot air trim systems 26 can meter the hotter medium for mixing with the medium discharged from air conditioning units 22 to help maintain a target range of pressures, temperatures, and/or humidity within cabin 12. The conditioned medium discharged from air conditioning units 22 and the hot medium discharged from hot air trim systems 26 together form a fresh air inflow that is provided by first ECS 13*a* and second ECS 13*b* to first cabin air circulation system 16*a* and second cabin air circulation system 16*b* respectively.

The conditioned medium discharged from air conditioning units 22 is provided to air mixing units 30 via outlet ducts 24. The hot medium can be metered from hot air trim systems 26 to air mixing units 30 via trim outlet ducts 28. Return ducts 32 of first cabin air circulation system 16*a* and second cabin air circulation system 16*b* extend from cabin 12 to air mixing units 30 respectively to deliver air exhausted from cabin 12 to air mixing units 30. Air mixing units 30 are mixing manifolds within which the air recirculated from cabin 12 can be mixed with the fresh air inflow from first ECS 13*a* and second ECS 13*b* to achieve a total air inflow F having one or more desired parameters, such as temperature, pressure, and humidity for example. The proportions of conditioned medium and hot medium making up the fresh air inflow from first ECS 13*a* and second ECS 13*b* can adjusted over time to help the total air inflow F achieve the one or more desired parameters.

In the example shown in FIG. 1, the total air inflow F is delivered to cabin 12 from air mixing units 30 via conduits 36 of air distribution system 34. As shown, total air inflow F may be delivered to cabin 12 and a cockpit of aircraft 11 via a ventilation system arranged near a ceiling of cabin 12. In some examples, the total air inflow F typically circulates from the top of cabin 12 toward the floor and is distributed to cabin vents 42 spaced laterally between the front and rear of cabin 12. Return ducts 32 of cabin air circulation system 16 fluidly connect cabin outlets 40 to air mixing units 30. Filters 44 are mounted within return ducts 32 and are configured to remove harmful microbes such as bacteria, viruses, spores, fungi and particulate matter from the air exiting cabin 12 as the air flows through filters 44 before entering air mixing units 30. Although filters 44 are shown in FIG. 1 as being arranged adjacent downstream ends of return duct 32, such as directly upstream from an interface between return ducts 32 and air mixing units 30, filters 44 can be arranged at any location within return ducts 32. Filters 44 can comprise a HEPA-type filter. However, any suitable filter, or combination of multiple filters is within the scope of this disclosure. Recirculation fans 38 are connected to return ducts 32 to establish an overpressure that is used to drive the flow of the recirculating cabin air through filters 44 and into air mixing units 30. However, examples are contemplated herein where a portion of cabin air circulation system 16 does not include a fan such that air flow through return ducts 32 and conduits 36 is driven by another source or by pressure. It should be understood that first cabin air circulation system 16*a* and second cabin air circulation system 16*b* illustrated in FIG. 1 and described herein is intended as an example only, and that other cabin air circulation systems are within the scope of this disclosure.

Occupancy sensors 20 are located within cabin 12. In the example of FIG. 1 occupancy sensors 20 form an array of sensors that are mounted proximate the front of cabin 12 and are aimed such that a field of view of occupancy sensors 20 includes all of cabin 12. In other examples, occupancy sensors 20 can include a plurality of sensor arrays that are distributed about cabin 12 and work together to obtain a field of view that includes all of cabin 12. Occupancy sensors 20 include at least one of the following sensors: line-of-sight (LOS) sensors, infrared sensors, thermal imagers, motion detecting sensors and/or an electro-optical sensor, and any other sensor capable of viewing seats within cabin 10 and detecting which of the seats are occupied and/or unoccupied. Occupancy sensors 20 are in wired or wireless communication with controller 18 of air controller system 10 such that controller receives data from occupancy sensors 20. Occupancy sensors 20 in cabin 12 can include a built-in processor and non-transitory system memory with stored artificial intelligence (AI) and machine learning software tools to process the data generated by occupancy sensors 20 before sending the data to controller 18.

Controller 18 is an electronic controller that is in wired or wireless communication with first ECS 13*a*, second ECS 13*b*, first cabin air circulation system 16*a*, and second cabin air circulation system 16*b*. As discussed below with reference to FIGS. 2-4, controller 18 communicates with first cabin air circulation system 16*a*, second cabin air circulation system 16*b*, first ECS 13*a*, and second ECS 13*b* to automatically adjust operation of first cabin air circulation system 16*a*, second cabin air circulation system 16*b*, first ECS 13*a*, and/or second ECS 13*b* based on the data received by controller 18 from occupancy sensors 20 to achieve a flow rate of the total air inflow F outputted from air mixing units 30 that is sufficient to meet regulatory requirements and passenger comfort levels without over-ventilating cabin 12. Controller 18 can include a built-in processor and non-transitory system memory to enable controller 18.

Figure 2:
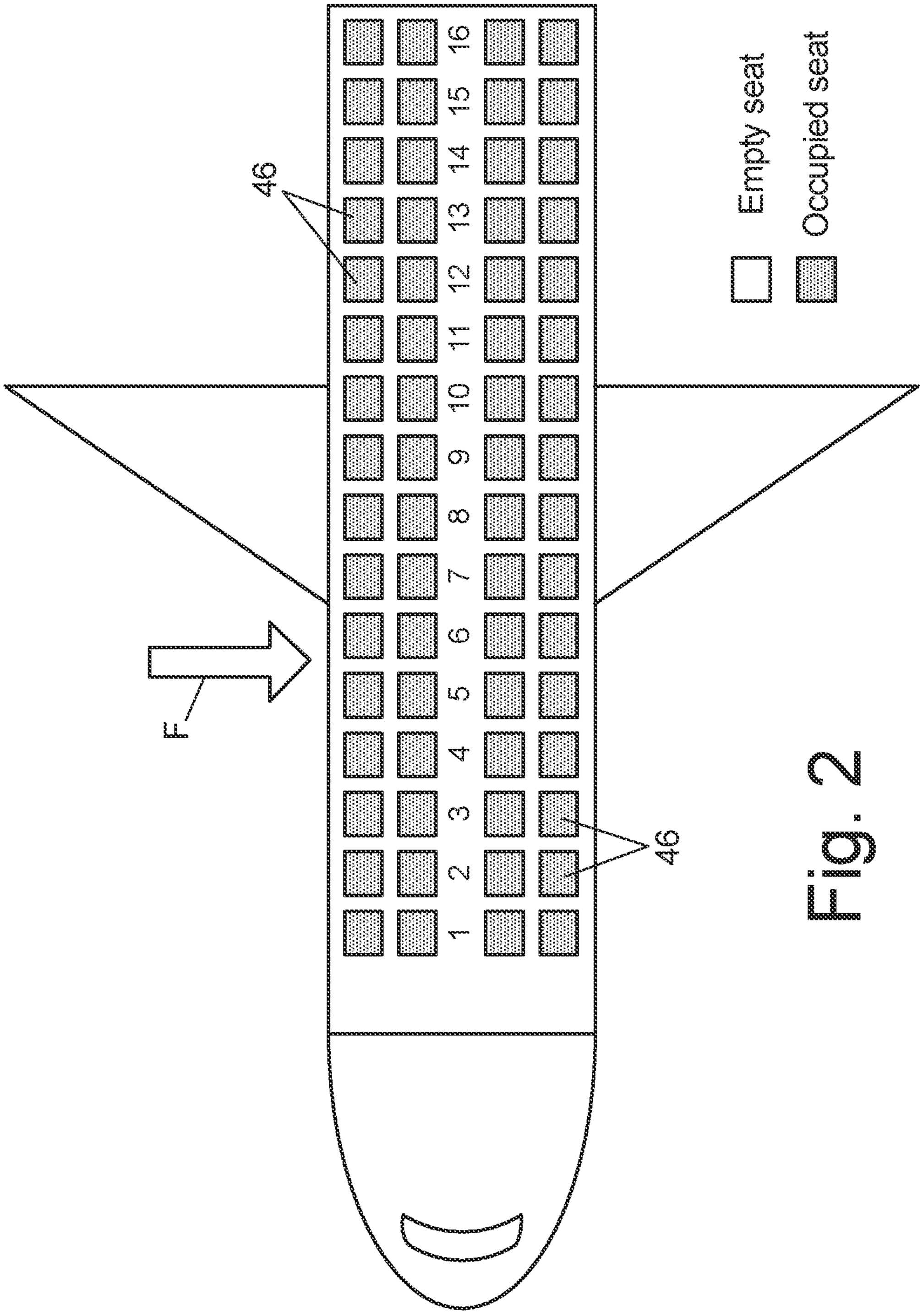
FIG. 2 is a schematic diagram of a fully occupied cabin of an aircraft.
Figure 3:
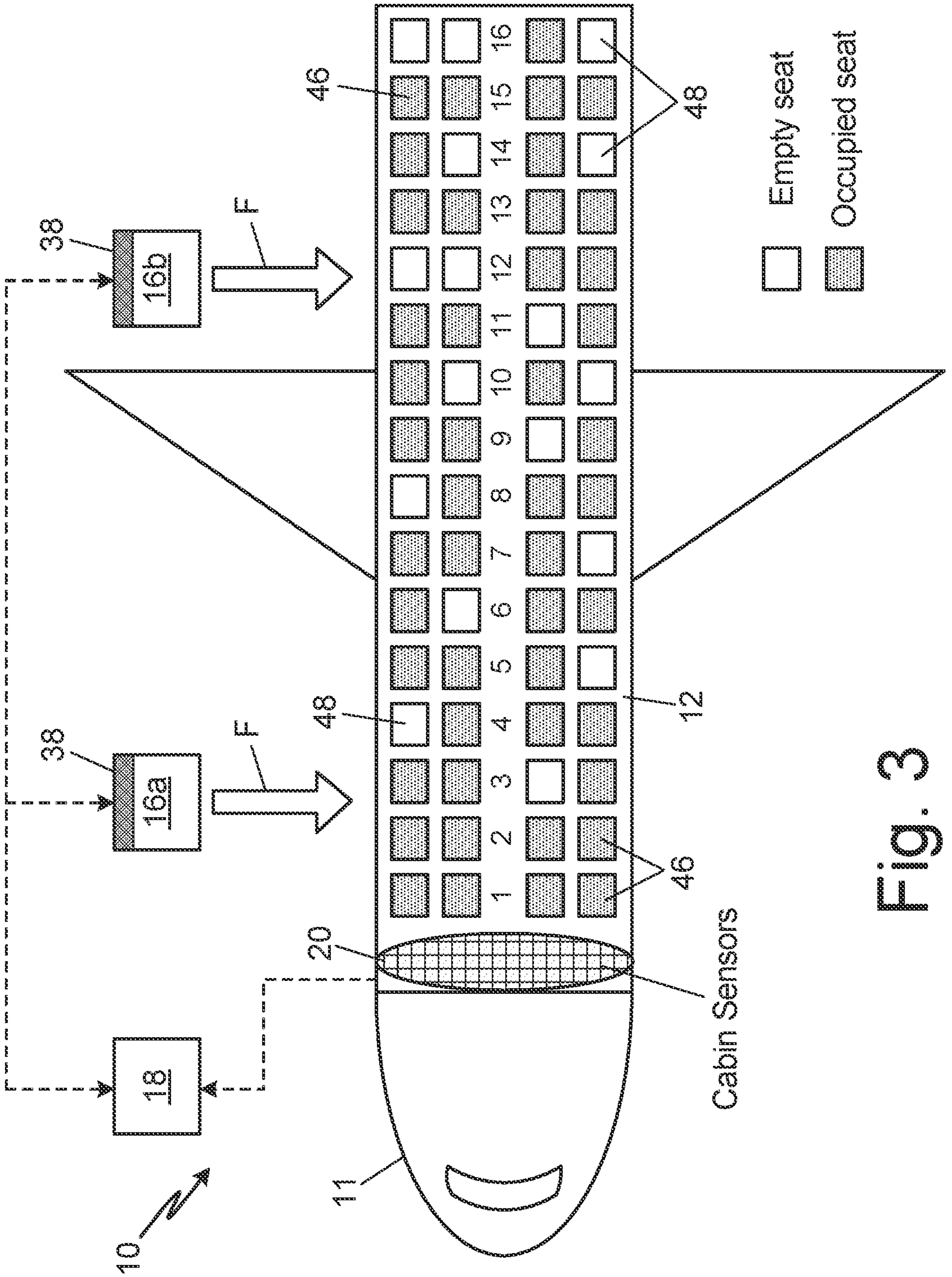
FIG. 3 is a schematic diagram of a partially occupied cabin of the aircraft of FIG. 1.
Figure 4:
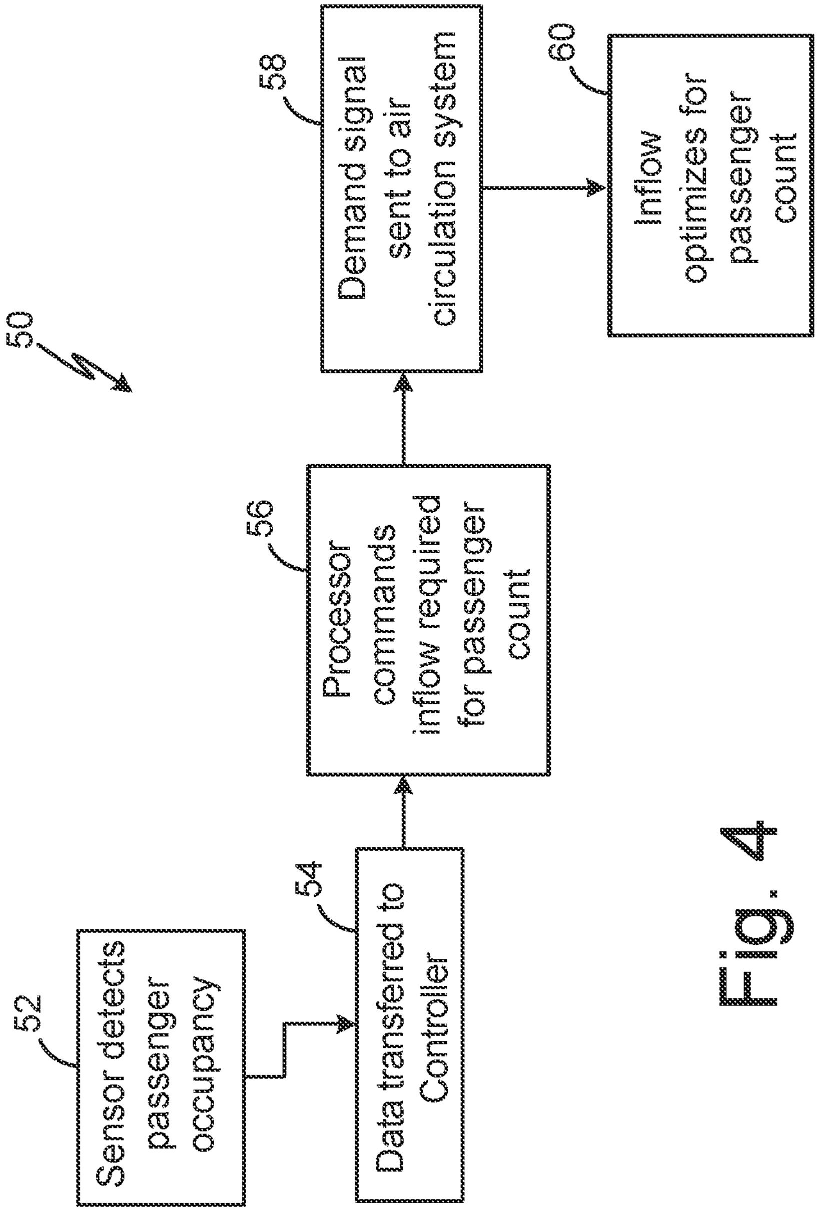
FIG. 4 is a logic flow diagram for cabin inflow of the air controller system based on occupancy of the cabin detected by cabin sensors.

FIGS. 2-4 will be discussed concurrently. FIG. 2 is a schematic diagram of an aircraft with a cabin that is fully occupied. FIG. 3 is a schematic diagram of cabin 12 of aircraft 11 from FIG. 1 with cabin 12 being partially occupied. As shown in FIG. 3, cabin 12 includes occupied seats 46, empty seats 48, and total air inflow F. FIG. 4 is a logic flow diagram 50 for total air inflow F of air controller system 10 into cabin 12 based on occupancy of cabin 12 detected by cabin occupancy sensors 20. Logic flow diagram 50 includes first step 52, second step 54, third step 56, fourth step 58, and fifth step 60.

In passenger aircraft, the FAA prescribes that 0.25 kg (0.55 lb) of conditioned air per minute must be provided for each passenger on an aircraft. To comply with these requirements, system designers in the past have assumed that every seat on the aircraft will be an occupied seat 46, such as shown in the aircraft of FIG. 2. Traditionally, total air inflow F into the cabin of the aircraft of FIG. 2 would then be set and fixed to provide 0.25 kg (0.55 lb) of conditioned air per minute for every seat inside of the cabin, regardless if that seat was actually occupied. In reality, aircraft often have both occupied seats 46 and empty seats 48 during a flight, as shown in FIG. 3. Setting air controller system 10 (shown in FIG. 1) at a rate that supplies total air inflow F into cabin 12 sufficient for a fully occupied cabin is inefficient and costly when cabin 12 has several unoccupied seats 48.

To increase the efficiency and decrease the operating cost of air controller system 10, controller 18 uses cabin occupancy sensors 20 to automatically adjust a flow of first cabin air circulation system 16*a*, second cabin air circulation system 16*b*, first ECS 13*a*, and second ECS 13*b* so that total air inflow F into cabin 12 does not exceed regulatory requirements. As discussed above with reference to FIG. 1, occupancy sensors 20 are in cabin 12 and are configured to detect occupied seats 46 and empty seats 48. For example, occupancy sensors 20 can include infrared sensors that detect a higher thermal signature of the passengers in occupied seats 46 and a lower signature of empty seats 48 and a processor of occupancy sensors 20 can compare those thermal signatures to a reference map of the cabin to determine how many occupied seats 46 and empty seats 48 are present in cabin 12. Occupancy sensors 20 can also include movement sensors and/or an electro-optical sensor that detect movement of the passengers within cabin 12 over time, and the processor of occupancy sensors 20 can compare the detected movement of the passengers with the reference map of the cabin to determine how many occupied seats 46 and empty seats 48 are present in cabin 12. Sensing the number of occupied seats 46 and empty seats 48 by cabin occupancy sensors 20 to determine the passenger occupancy of cabin 12 forms first step 52 of logic flow diagram 50 of FIG. 4.

Once occupancy sensors 20 sense a number of empty seats 48 and occupied seats 46 within cabin 12, occupancy sensors 20 communicate data representative of the number of empty seats 48 and/or representative of the number of occupied seats 46 to controller 18, which completes second step 54 of logic flow diagram 50 of FIG. 4. As previously noted, controller 18 is in communication with first cabin air circulation system 16*a*, first ECS 13*a*, and second ECS 13*b*. Once controller 18 receives the data from occupancy sensors 20, third step 56 of logic flow diagram 50 is performed by the processor of controller 18 using the data from occupancy sensors 20 to determine what the rate should be for total air inflow F into cabin 12 based on the number of passengers sensed by occupancy sensors 20.

Controller 18 can then send flow commands to first cabin air circulation system 16*a*, second cabin air circulation system 16*b*, first ECS 13*a*, and second ECS 13*b* to adjust a rate of total air inflow F into cabin 12 based on the number of empty seats 48 sensed by cabin occupancy sensors 20, as shown in fourth step 58 and fifth step 60 of logic flow diagram 50 of FIG. 4. Recirculation fans 38 of first cabin air circulation system 16*a* and second cabin air circulation system 16*b* can be in communication with controller 18 and can adjust in speed in response to the flow command from controller 18. Thus controller 18 can adjust the speed of recirculation fans 38 to achieve the rate of total air inflow F into cabin 12 appropriate for the number of occupied seats 46 sensed by cabin occupancy sensors 20. Controller 18 can also adjust the speed at which ECS 13*a* and ECS 13*b* provide fresh air inflow to first cabin air circulation system 16*a* and second cabin air circulation system 16*b* to help achieve the rate of total air inflow F into cabin 12 appropriate for the number of occupied seats 46 sensed by cabin occupancy sensors 20. In addition to sensing a passenger count within cabin 12 of aircraft 11, cabin occupancy sensors 20 can also sense a distribution of the passengers within cabin 12 and thermal gradients within cabin 12, as discussed below with reference to FIGS. 5-8.

Figure 5:
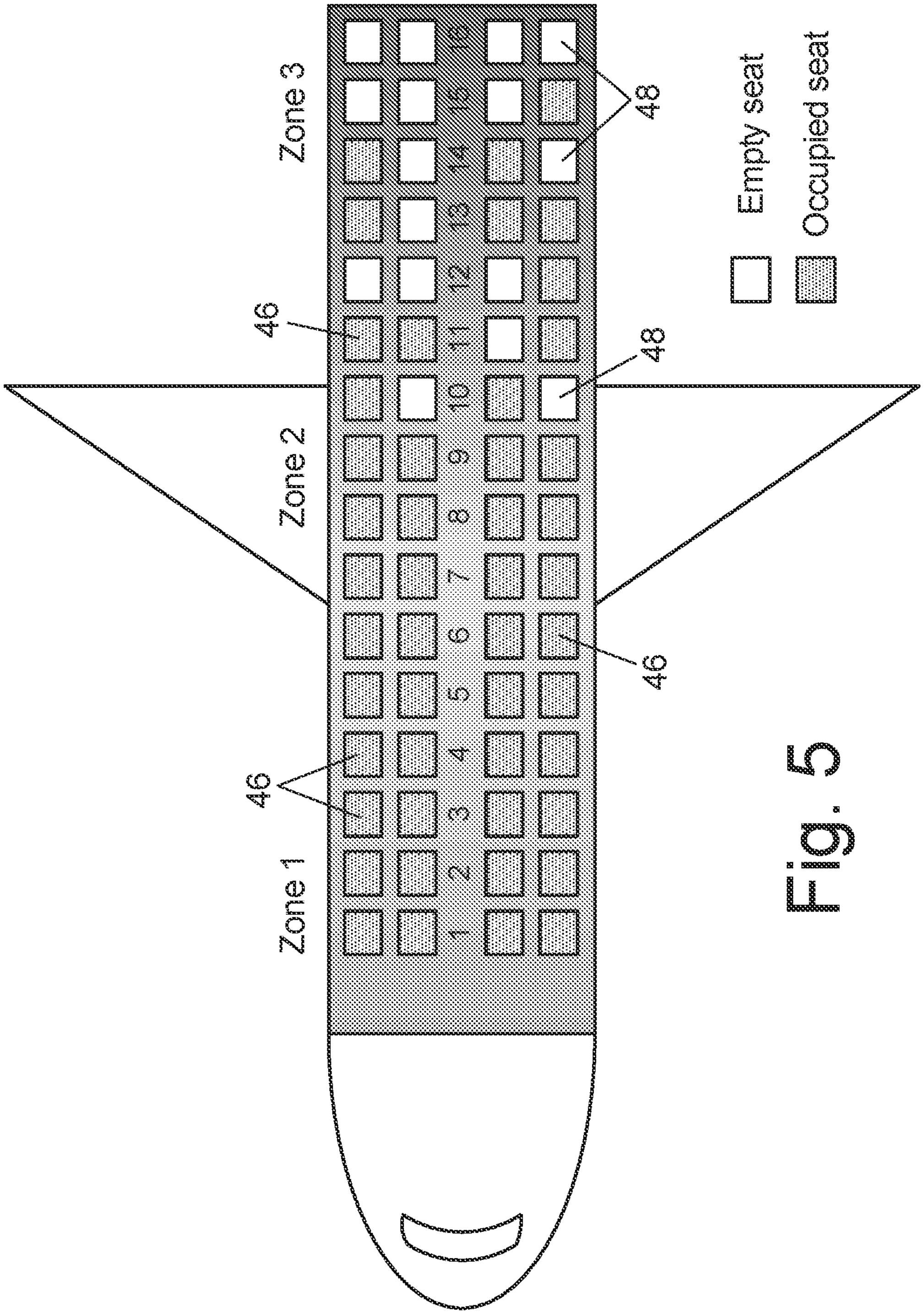
FIG. 5 is a schematic diagram of a partially occupied cabin of an aircraft.
Figure 6:
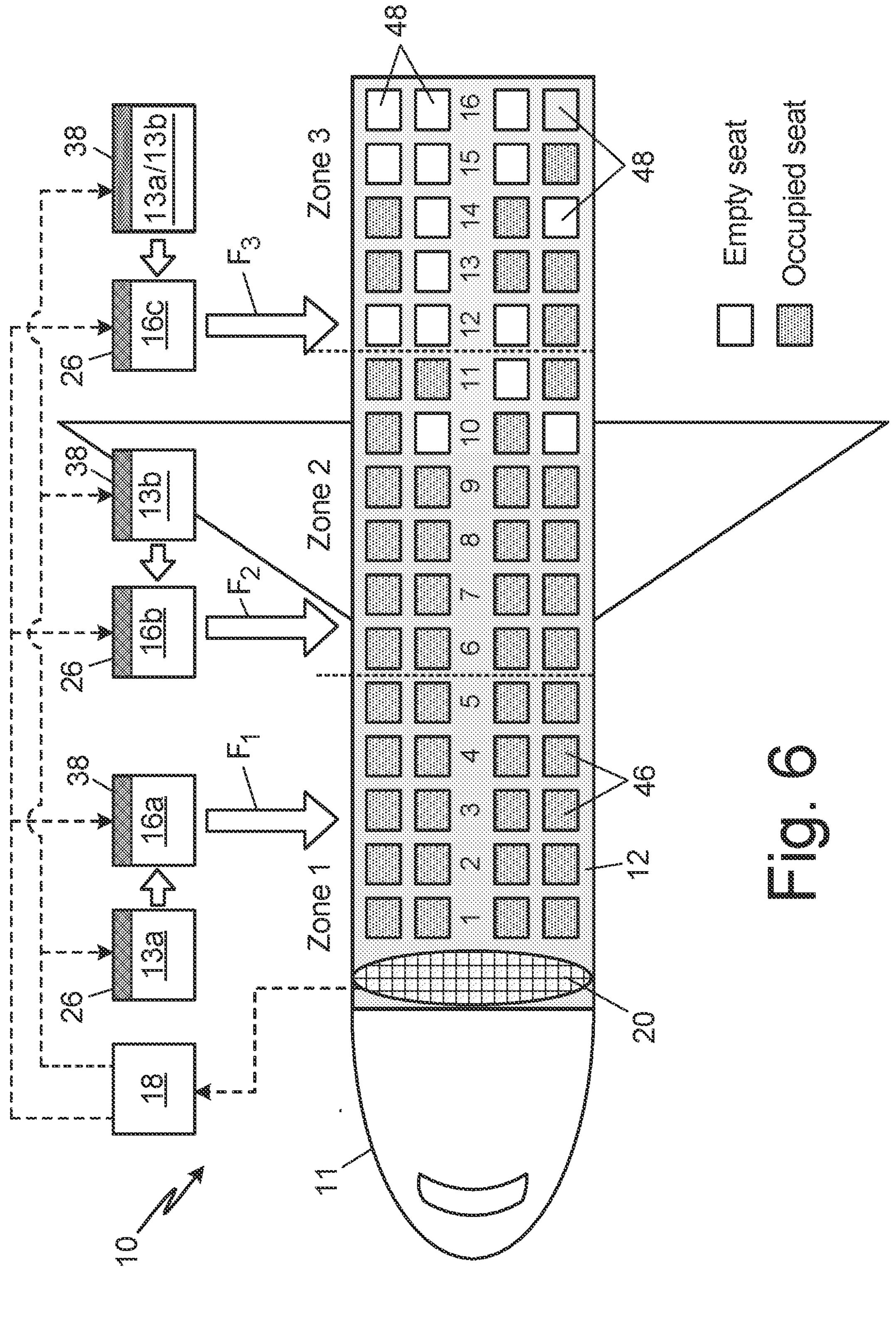
FIG. 6 is a schematic diagram of a partially occupied cabin of the aircraft of FIG. 1.

FIG. 5 is a schematic diagram of an aircraft with a cabin that includes a first zone (hereinafter referred to as "zone 1"), a second zone (hereinafter referred to as "zone 2"), and a third zone (hereinafter referred to as "zone 3"). In the example of FIG. 5, every seat in zone 1 of the aircraft is an occupied seat 46. Many empty seats 48 are present in zone 3. Zone 2 is between zone 1 and zone 3 and includes fewer empty seats 48 than zone 3 and fewer occupied seats than zone 1. Passengers within the aircraft generate heat. Since zone 1 includes more passengers than zones 2 and 3, zone 1 can be hotter than zones 2 and 3 and more uncomfortable due to the hot temperatures of zone 1. Since zone 3 includes fewer passengers than zones 1 and 2, zone 3 can be colder than zones 1 and 2 and more uncomfortable due to the cold temperatures of zone 3. As shown in FIG. 6, cabin occupancy sensors 20 can detect thermal gradients within the zones of cabin 12 of aircraft 11, and the data from cabin occupancy sensors 20 can be used by air controller system 10 to achieve an even and comfortable temperature across zones 1, 2, and 3 of aircraft 11.

FIG. 6 is a schematic diagram of cabin 12 of aircraft 11 with cabin 12 divided into zone 1, zone 2, and zone 3. In the example of FIG. 6, air controller system 10 includes first ECS 13*a*, second ECS 13*b*, first cabin air circulation system 16*a*, second cabin air circulation system 16*b*, and third cabin air circulation system 16*c*. First ECS 13*a* supplies mixed medium to first cabin air circulation system 16*a*, and first cabin air circulation system 16*a* supplies first air inflow $F_1$ to zone 1 of cabin 12. Second ECS 13*b* supplies mixed medium to second cabin air circulation system 16*b*, and second cabin air circulation system 16*b* supplies second air inflow $F_2$ to zone 2 of cabin 12. First ECS 13*a* and/or second ECS 13*b* can supply mixed medium to third cabin air circulation system 16*c*, and third cabin air circulation system 16*c* supplies third air inflow $F_3$ to zone 3 of cabin 12. Controller 18 is in communication with each of first ECS 13*a*, second ECS 13*b*, first cabin air circulation system 16*a*, second cabin air circulation system 16*b*, and third cabin air circulation system 16*b*. In the particular example of FIG. 6, the passengers are unevenly distributed between zones 1, 2, and 3 of cabin 12. Similar to FIG. 5, every seat in zone 1 of cabin 12 of aircraft 11 is an occupied seat 46, many empty seats 48 are present in zone 3, and zone 2 is between zone 1 and zone 3 and includes fewer empty seats 48 than zone 3 and fewer occupied seats than zone 1.

While the passengers are onboard aircraft 11, cabin occupancy sensors 20 sense a distribution of empty seats 48 within cabin 12 of aircraft 11 and can also sense the surface temperatures of the passengers in each of zones 1, 2, and 3. For example, cabin occupancy sensors 20 can include a thermal infrared camera that senses the heat signatures of the passengers in zone 1 to determine a first distribution of empty seats within zone 1, and can also use the heat signatures of the passengers in zone 1 to sense surface temperatures of passengers within zone 1 of cabin 12. Cabin occupancy sensors 20 can communicate data representative of the first distribution of empty seats 48 within zone 1 to controller 18. Cabin occupancy sensors 20 can also communicate data representative of the surface temperatures of the passengers within zone 1 of cabin 12 to controller 18.

In response to the data from cabin occupancy sensors 20 concerning zone 1, controller 18 can send a first temperature command to first ECS 13*a* to adjust a temperature of first air inflow $F_1$ into zone 1 of cabin 12 based on the surface temperatures of the passengers within zone 1 and/or the first distribution of empty seats 48 sensed by cabin occupancy sensors 20. For example, controller 18 can send the first temperature command to first ECS 13*a* indicating that zone 1 is completely full of passengers and the passengers within zone 1 have an average skin temperature that is above a comfort level set by the flight crew. In response to the first temperature command, first ECS 13*a* can reduce the amount of medium contributed by hot air trim system 26 of first ECS 13*a* to first cabin air circulation system 16*a*, thereby reducing the temperature of first air inflow $F_1$ into zone 1. Controller 18 can also send a first flow command to first cabin air circulation system 16*a* to adjust a rate of first air inflow $F_1$ into zone 1 of cabin 12 based on the number of empty seats 48 in zone 1 sensed by cabin occupancy sensors 20. The first flow command of controller 18 can adjust the rate of first air inflow $F_1$ by adjusting a speed of recirculation fan 38 of first cabin air circulation system 16*a*. Varying the rate of first air inflow $F_1$ into zone 1 allows air controller system 10 to achieve a desired temperature in zone 1 of cabin 12 in a shorter amount of time.

Cabin occupancy sensors 20 can also sense the heat signatures of the passengers in zone 2 to sense a second distribution of empty seats within zone 2, and can also use the heat signatures of the passengers in zone 2 to sense surface temperatures of passengers within zone 2 of cabin 12. Cabin occupancy sensors 20 can communicate data representative of the second distribution of empty seats 48 within zone 2 to controller 18. Cabin occupancy sensors 20 can also communicate data representative of the surface temperatures of the passengers within zone 2 of cabin 12 to controller 18.

In response to the data from cabin occupancy sensors 20 concerning zone 2, controller 18 can send a second temperature command to second ECS 13*b* to adjust a temperature of second air inflow $F_2$ into zone 2 of cabin 12 based on the surface temperatures of the passengers within zone 2 and/or the second distribution of empty seats 48 sensed by cabin occupancy sensors 20. For example, controller 18 can send the second temperature command to second ECS 13*b* indicating that zone 2 is mostly full of passengers and the passengers within zone 2 have an average skin temperature that is near the comfort level set by the flight crew. In response to the second temperature command, second ECS 13*b* can maintain the amount of medium contributed by hot air trim system 26 of second ECS 13*b* to second cabin air circulation system 16*b*, thereby holding steady the temperature of second air inflow $F_2$ into zone 2. Controller 18 can also send a second flow command to second cabin air circulation system 16*b* to adjust a rate of second air inflow $F_2$ into zone 2 of cabin 12 based on the number of empty seats 48 in zone 2 sensed by cabin occupancy sensors 20. The second flow command of controller 18 can adjust the rate of second air inflow $F_2$ by adjusting a speed of recirculation fan 38 of second cabin air circulation system 16*b*. Varying the rate of second air inflow $F_2$ into zone 2 allows air controller system 10 to achieve a desired temperature in zone 2 of cabin 12 in a shorter amount of time.

Cabin occupancy sensors 20 can also sense the heat signatures of the passengers in zone 3 to sense a third distribution of empty seats within zone 3, and can also use the heat signatures of the passengers in zone 3 to sense surface temperatures of passengers within zone 3 of cabin 12. Cabin occupancy sensors 20 can communicate data representative of the third distribution of empty seats 48 within zone 3 to controller 18. Cabin occupancy sensors 20 can also communicate data representative of the surface temperatures of the passengers within zone 3 of cabin 12 to controller 18.

In response to the data from cabin occupancy sensors 20 concerning zone 3, controller 18 can send a third temperature command to first ECS 13*a* and/or second ECS 13*b* to adjust a temperature of third air inflow $F_3$ into zone 3 of cabin 12 based on the surface temperatures of the passengers within zone 3 and/or the third distribution of empty seats 48 sensed by cabin occupancy sensors 20. For example, controller 18 can send the third temperature command to first ECS 13*a* and/or second ECS 13*b* indicating that zone 3 has a relatively small number of passengers and the passengers within zone 3 have an average skin temperature that is below the comfort level set by the flight crew. In response to the third temperature command, first ECS 13*a* and/or second ECS 13*b* can increase the amount of medium contributed by hot air trim system 26 of first ECS 13*a* and/or second ECS 13*b* to third cabin air circulation system 16*c*, thereby raising the temperature of third air inflow $F_3$ into zone 3. Controller 18 can also send a third flow command to third cabin air circulation system 16*b* to adjust a rate of third air inflow $F_3$ into zone 3 of cabin 12 based on the number of empty seats 48 in zone 3 sensed by cabin occupancy sensors 20. The third flow command of controller 18 can adjust the rate of third air inflow $F_3$ by adjusting a speed of recirculation fan 38 of third cabin air circulation system 16*c*. Varying the rate of third air inflow $F_3$ into zone 3 allows air controller system 10 to achieve a desired temperature in zone 3 of cabin 12 in a shorter amount of time.

Figure 8:
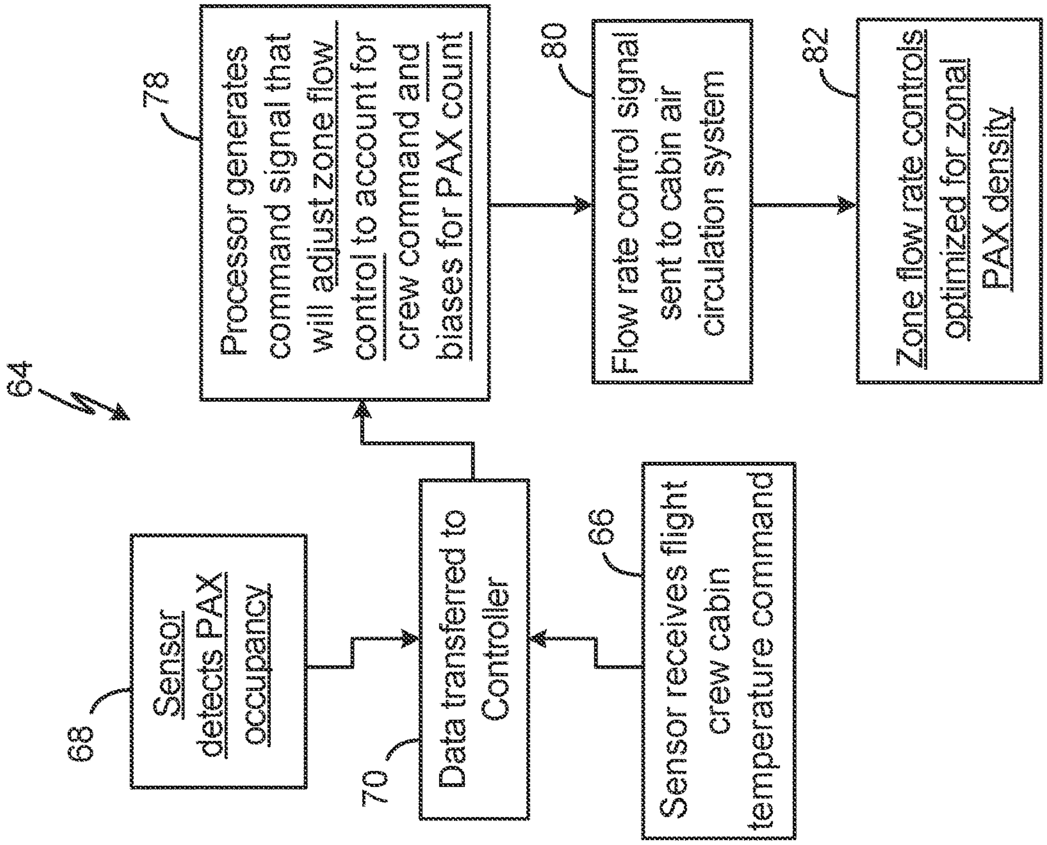
FIG. 8 is a logic flow diagram for cabin zone flow control of the air controller system based on occupancy of the cabin detected by cabin sensors.
Figure 7:
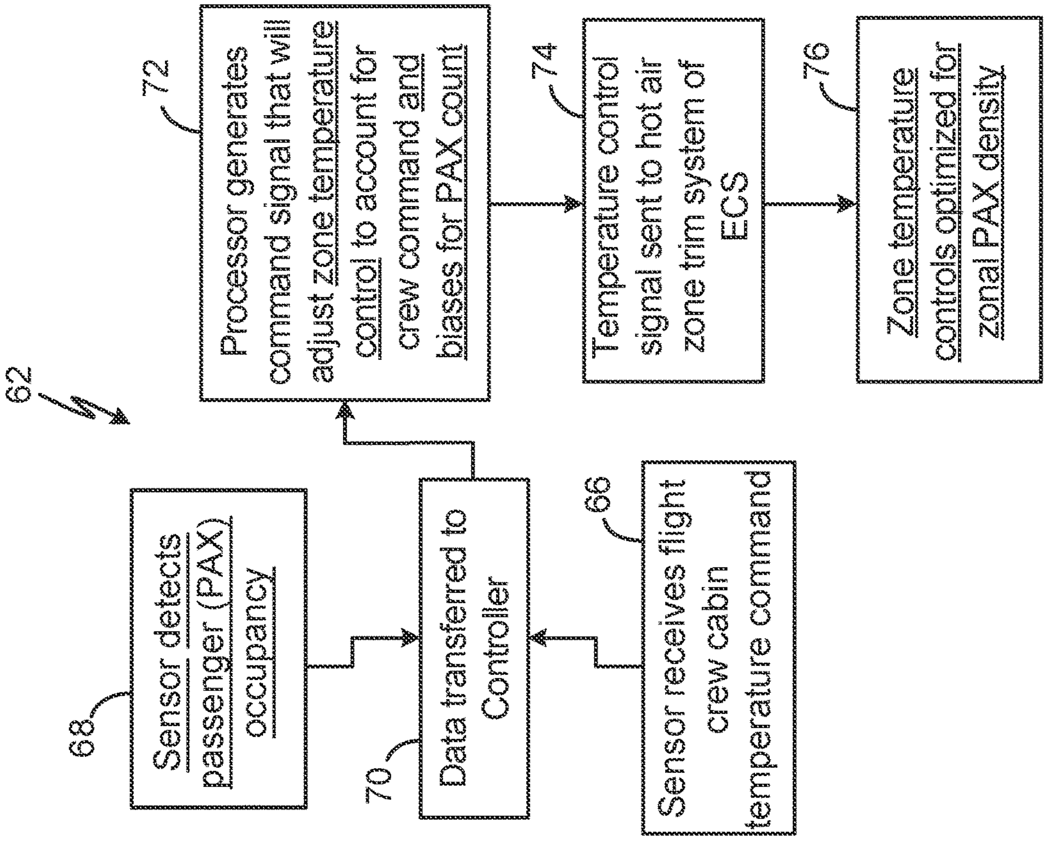
FIG. 7 is a logic flow diagram for cabin zone thermal control of the air controller system based on occupancy of the cabin detected by the cabin sensors.

FIGS. 7 and 8 will be discussed concurrently. FIG. 7 is a logic flow diagram 62 for cabin zone thermal control of air controller system 10 based on occupancy of cabin 12 detected by cabin occupancy sensors 20. FIG. 8 is a logic flow diagram 64 for cabin zone flow control of air controller system 10 based on the occupancy of cabin 12 detected by cabin occupancy sensors 20. The methods depicted by the logic flow diagrams of FIGS. 7 and 8 can be performed simultaneously by air controller system 10 so that cabin 12 receives both adequate cabin zone thermal control and cabin zone flow control. The logic flow diagram 62 of FIG. 7 and the logic flow diagram 64 of FIG. 8 can both include first step 66, second step 68, and third step 70. First step 66 includes cabin occupancy sensors 20 receiving a flight crew cabin temperature command, which is a command from a flight crew member of aircraft 11 to set cabin 12 at a particular temperature. Second step 68 includes cabin occupancy sensors 20 detecting the passenger occupancy of cabin 12. As discussed above with reference to FIGS. 1-6, cabin occupancy sensors 20 are able to detect the passenger occupancy of cabin 12 by sensing which seats in cabin 12 are occupied and which seats are empty. Third step 70 includes transferring data from cabin occupancy sensors 20 to controller 18. The data transferred from cabin occupancy sensors 20 to controller 18 can include the flight crew cabin temperature command, the number of passengers or occupants in cabin 12, and the distribution of passengers in cabin 12.

In the fourth step 72 of the logic flow diagram 62 of FIG. 7, a processor of controller 18 generates a command signal that will adjust zone temperature control in cabin 12 to account for the flight crew cabin temperature command along with the thermal effects and biases caused by the passenger count in cabin 12. Next, in fifth step 74 of logic flow diagram 62 of FIG. 7, controller 18 sends the command signal to hot air trim system 26 of an ECS 13 of air controller system 10. In sixth step 74 of logic flow diagram 62 of FIG. 7, hot air trim system 26 responds by increasing or decreasing the amount of hot air that is mixed into total air inflow F such that total air inflow F entering cabin 12 is optimized at a temperature that will cause cabin 12 to reach the temperature targeted by the flight crew.

In the fourth step 78 of the logic flow diagram 64 of FIG. 8, the processor of controller 18 generates a command signal that will adjust zone flow control in cabin 12 to account for the flight crew cabin temperature command along with the thermal and ventilation biases caused by the passenger count in cabin 12. Next, in fifth step 80 of logic flow diagram 64 of FIG. 8, controller 18 sends the command signal to cabin air circulation system 16 of controller system 10. In sixth step 82 of logic flow diagram 64 of FIG. 8, cabin air circulation system 16 responds by increasing or decreasing the flow rate of total air inflow F into cabin 12 such that total air inflow F entering cabin 12 is optimized at a flow rate that will cause cabin 12 to reach the temperature targeted by the flight crew along with the ventilation required by FAA regulations.

Discussion of Possible Embodiments

The following are non-exclusive descriptions of possible embodiments of the present invention.

In one example, a method is disclosed for controlling an atmosphere within an aircraft. The method includes sensing, by at least one cabin occupancy sensor, a number of empty seats within a cabin of the aircraft. Data representative of the number of empty seats from the at least one cabin occupancy sensor is communicated by the at least one cabin occupancy sensor to an electronic controller. The electronic controller is in communication with a cabin air circulation system and at least one environmental control system. The electronic controller sends a flow command to both the at least one environmental control system and the cabin air circulation system to adjust a rate of a total air inflow into the cabin based on the number of empty seats sensed by the at least one cabin occupancy sensor.

The method of the preceding paragraph can optionally include, additionally and/or alternatively, any one or more of the following features, configurations and/or additional components:

- adjusting a speed of a recirculation fan of the cabin air circulation system in response to the flow command from the electronic controller;
- sensing, by the at least one cabin occupancy sensor, a distribution of empty seats within the cabin of the aircraft; communicating data representative of the distribution of empty seats from the at least one cabin occupancy sensor to the electronic controller; and sending a temperature command, by the electronic controller, to the at least one environmental control system to adjust a temperature of the total air inflow into the cabin based on the distribution of empty seats sensed by the at least one cabin occupancy sensor;
- sensing, by the at least one cabin occupancy sensor, a first distribution of empty seats within a first zone of the cabin of the aircraft; communicating data representative of the first distribution of empty seats from the at least one cabin occupancy sensor to the electronic controller, wherein the electronic controller is in communication with a first environmental control system; and sending a first temperature command, by the electronic controller, to the first environmental control system to adjust a temperature of a first air inflow into the first zone of the cabin based on the first distribution of empty seats sensed by the at least one cabin occupancy sensor;
- sensing, by the at least one cabin occupancy sensor, a second distribution of empty seats within a second zone of the cabin of the aircraft; communicating data representative of the second distribution of empty seats from the at least one cabin occupancy sensor to the electronic controller, wherein the electronic controller is in communication with a second environmental control system; and sending a second temperature command, by the electronic controller, to the second environmental control system to adjust a temperature of a second air inflow into the second zone of the cabin based on the second distribution of empty seats sensed by the at least one cabin occupancy sensor;
- sensing, by the at least one cabin occupancy sensor, surface temperatures of passengers within a first zone of the cabin of the aircraft; communicating data representative of the surface temperatures of the passengers within the first zone from the at least one cabin occupancy sensor to the electronic controller, wherein the electronic controller is in communication with a first environmental control system; and sending a first temperature command, by the electronic controller, to the first environmental control system to adjust a temperature of a first air inflow into the first zone of the cabin based on the surface temperatures of the passengers within the first zone sensed by the at least one cabin occupancy sensor; and/or
- sensing, by the at least one cabin occupancy sensor, surface temperatures of passengers within a second zone of the cabin of the aircraft; communicating data representative of the surface temperatures of the passengers within the second zone from the at least one cabin occupancy sensor to the electronic controller, wherein the electronic controller is in communication with a second environmental control system; and sending a second temperature command, by the electronic controller, to the second environmental control system to adjust a temperature of a second air inflow into the second zone of the cabin based on the surface temperatures of the passengers within the second zone sensed by the at least one cabin occupancy sensor.

In another example, an air controller system for controlling an atmosphere within an aircraft includes a cabin air circulation system and at least one cabin occupancy sensor in a cabin of the aircraft. The at least one cabin occupancy sensor is configured to detect a number of empty seats within the cabin. An electronic controller is in communication with the cabin air circulation system and the at least one cabin occupancy sensor. The electronic controller is configured to receive data from the at least one cabin occupancy sensor representative of the number of empty seats detected by the cabin occupancy sensor. The electronic controller is also configured to send commands to the cabin air circulation system based on the number of empty seats detected by the cabin occupancy sensor.

The system of the preceding paragraph can optionally include, additionally and/or alternatively, any one or more of the following features, configurations and/or additional components:

an environmental control system, wherein the at least one cabin occupancy sensor is configured to detect a distribution of empty seats within the cabin, and wherein the electronic controller is in communication with the environmental control system and is configured to send commands to the environmental control system based on the distribution of empty seats within the cabin detected by the cabin occupancy sensor;

the at least one cabin occupancy sensor comprises at least one of a line-of-sight sensor, an infrared sensor, a thermal imager, a motion detecting sensor, and/or an electro-optical sensor;

the at least one cabin occupancy sensor is mounted to a front end of the cabin and comprises a field of view sized to view an entire width and length of the cabin; and/or the cabin air circulation system comprises: a recirculation fan in communication with the electronic controller.

In another example, a method is disclosed for controlling an atmosphere within an aircraft. The method includes sensing, by at least one cabin occupancy sensor, surface temperatures of passengers within a first zone of a cabin of the aircraft. The at least one cabin occupancy sensor communicates data representative of the surface temperatures of the passengers within the first zone to an electronic controller. The electronic controller is in communication with a first environmental control system. The electronic controller sends a first temperature command to the first environmental control system to adjust a temperature of a first air inflow into the first zone of the cabin based on the surface temperatures of the passengers within the first zone sensed by the at least one cabin occupancy sensor.

The method of the preceding paragraph can optionally include, additionally and/or alternatively, any one or more of the following features, configurations and/or additional components:

sensing, by the at least one cabin occupancy sensor, surface temperatures of passengers within a second zone of the cabin of the aircraft; communicating data representative of the surface temperatures of the passengers within the second zone from the at least one cabin occupancy sensor to the electronic controller, wherein the electronic controller is in communication with a second environmental control system; and sending a second temperature command, by the electronic controller, to the second environmental control system to adjust a temperature of a second air inflow into the second zone of the cabin based on the surface temperatures of the passengers within the second zone sensed by the at least one cabin occupancy sensor;

sensing, by the at least one cabin occupancy sensor, a number of empty seats within the first zone of the cabin of the aircraft; communicating data representative of the number of empty seats within the first zone from the at least one cabin occupancy sensor to the electronic controller, wherein the electronic controller is in communication with a first cabin air circulation system; and sending a first flow command, by the electronic controller, to the first cabin air circulation system to adjust a rate of the first air inflow into the first zone of the cabin based on the number of empty seats in the first zone sensed by the at least one cabin occupancy sensor;

sensing, by the at least one cabin occupancy sensor, a number of empty seats within the second zone of the cabin of the aircraft; communicating data representative of the number of empty seats within the second zone from the at least one cabin occupancy sensor to the electronic controller, wherein the electronic controller is in communication with a second cabin air circulation system; and sending a second flow command, by the electronic controller, to the second cabin air circulation system to adjust a rate of the second air inflow into the second zone of the cabin based on the number of empty seats in the second zone sensed by the at least one cabin occupancy sensor;

adjusting a speed of a first recirculation fan of the first cabin air circulation system in response to the first flow command from the electronic controller; and/or adjusting a speed of a second recirculation fan of the second cabin air circulation system in response to the second flow command from the electronic controller.

While the invention has been described with reference to an exemplary embodiment(s), it will be understood by those skilled in the art that various changes may be made and equivalents may be substituted for elements thereof without departing from the scope of the invention. For example, while FIGS. 1 and 3 show air controller system 10 with first ECS 13*a*, second ECS 13*b*, first cabin air circulation system 16*a*, and second cabin air circulation system 16*b*, in other examples, air controller system 10 can include a single ECS 13 that supplies conditioned air and hot trim air to several different cabin air circulation systems 16 and a valve system that controller 18 manages to customize flow from the single ECS 13 to each of the several different cabin air circulation systems 16. In other example, air controller system 10 can include a single ECS 13 that supplies conditioned air and hot trim air to a single cabin air circulation system 16, such as in an aircraft with a smaller cabin with only a single environmental zone. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for controlling an atmosphere within an aircraft, the method comprising:

sensing, by at least one cabin occupancy sensor, a number of empty seats within a cabin of the aircraft;

communicating data representative of the number of empty seats from the at least one cabin occupancy sensor to an electronic controller, wherein the electronic controller is in communication with a cabin air circulation system and at least one environmental control system; and sending a flow command, by the electronic controller, to the cabin air circulation system and/or the at least one environmental control system to adjust a rate of a total air inflow into the cabin based on the number of empty seats sensed by the at least one cabin occupancy sensor;

sensing, by the at least one cabin occupancy sensor, a distribution of empty seats within the cabin of the aircraft;

communicating data representative of the distribution of empty seats from the at least one cabin occupancy sensor to the electronic controller; and sending a temperature command, by the electronic controller, to the at least one environmental control system to adjust a temperature of the total air inflow into the cabin based on the distribution of empty seats sensed by the at least one cabin occupancy sensor.

2. The method of claim 1, further comprising:

adjusting a speed of a recirculation fan of the cabin air circulation system in response to the flow command from the electronic controller.

3. The method of claim 1, further comprising:

sensing, by the at least one cabin occupancy sensor, a first distribution of empty seats within a first zone of the cabin of the aircraft;

communicating data representative of the first distribution of empty seats from the at least one cabin occupancy sensor to the electronic controller, wherein the electronic controller is in communication with a first environmental control system; and sending a first temperature command, by the electronic controller, to the first environmental control system to adjust a temperature of a first air inflow into the first zone of the cabin based on the first distribution of empty seats sensed by the at least one cabin occupancy sensor.

4. The method of claim 3, further comprising:

sensing, by the at least one cabin occupancy sensor, a second distribution of empty seats within a second zone of the cabin of the aircraft;

communicating data representative of the second distribution of empty seats from the at least one cabin occupancy sensor to the electronic controller, wherein the electronic controller is in communication with a second environmental control system; and sending a second temperature command, by the electronic controller, to the second environmental control system to adjust a temperature of a second air inflow into the second zone of the cabin based on the second distribution of empty seats sensed by the at least one cabin occupancy sensor.

5. The method of claim 1, further comprising:

sensing, by the at least one cabin occupancy sensor, surface temperatures of passengers within a first zone of the cabin of the aircraft;

communicating data representative of the surface temperatures of the passengers within the first zone from the at least one cabin occupancy sensor to the electronic controller, wherein the electronic controller is in communication with a first environmental control system; and sending a first temperature command, by the electronic controller, to the first environmental control system to adjust a temperature of a first air inflow into the first zone of the cabin based on the surface temperatures of the passengers within the first zone sensed by the at least one cabin occupancy sensor.

6. The method of claim 5, further comprising:

sensing, by the at least one cabin occupancy sensor, surface temperatures of passengers within a second zone of the cabin of the aircraft;

communicating data representative of the surface temperatures of the passengers within the second zone from the at least one cabin occupancy sensor to the electronic controller, wherein the electronic controller is in communication with a second environmental control system; and sending a second temperature command, by the electronic controller, to the second environmental control system to adjust a temperature of a second air inflow into the second zone of the cabin based on the surface temperatures of the passengers within the second zone sensed by the at least one cabin occupancy sensor.

7. An air controller system for controlling an atmosphere within an aircraft, the air controller system comprising:

a cabin air circulation system;

at least one cabin occupancy sensor in a cabin of the aircraft and configured to detect a number of empty seats within the cabin;

an electronic controller in communication with the cabin air circulation system and the at least one cabin occupancy sensor, wherein the electronic controller is configured to receive data from the at least one cabin occupancy sensor representative of the number of empty seats detected by the at least one cabin occupancy sensor, and wherein the electronic controller is configured to send commands to the cabin air circulation system based on the number of empty seats detected by the at least one cabin occupancy sensor; and an environmental control system, wherein the at least one cabin occupancy sensor is configured to detect a distribution of empty seats within the cabin, and wherein the electronic controller is in communication with the environmental control system and is configured to send commands to the environmental control system based on the distribution of empty seats within the cabin detected by the at least one cabin occupancy sensor.

8. The air controller system of claim 7, wherein the at least one cabin occupancy sensor comprises at least one of a line-of-sight sensor, an infrared sensor, a thermal imager, a motion detecting sensor, and/or an electro-optical sensor.

9. The air controller system of claim 8, wherein the at least one cabin occupancy sensor is mounted to a front end of the cabin and comprises a field of view sized to view an entire width and length of the cabin.

10. The air controller system of claim 7, wherein the cabin air circulation system comprises:

a recirculation fan in communication with the electronic controller.

11. A method for controlling an atmosphere within an aircraft, the method comprising:

sensing, by at least one cabin occupancy sensor, surface temperatures of passengers within a first zone of a cabin of the aircraft;

communicating data representative of the surface temperatures of the passengers within the first zone from the at least one cabin occupancy sensor to an electronic controller, wherein the electronic controller is in communication with a first environmental control system;

sending a first temperature command, by the electronic controller, to the first environmental control system to adjust a temperature of a first air inflow into the first zone of the cabin based on the surface temperatures of the passengers within the first zone sensed by the at least one cabin occupancy sensor;

sensing, by the at least one cabin occupancy sensor, a number of empty seats within the first zone of the cabin of the aircraft;

communicating data representative of the number of empty seats within the first zone from the at least one cabin occupancy sensor to the electronic controller, wherein the electronic controller is in communication with a first cabin air circulation system; and sending a first flow command, by the electronic controller, to the first cabin air circulation system to adjust a rate of the first air inflow into the first zone of the cabin based on the number of empty seats in the first zone sensed by the at least one cabin occupancy sensor.

12. The method of claim 11, further comprising:

sensing, by the at least one cabin occupancy sensor, surface temperatures of passengers within a second zone of the cabin of the aircraft;

communicating data representative of the surface temperatures of the passengers within the second zone from the at least one cabin occupancy sensor to the electronic controller, wherein the electronic controller is in communication with a second environmental control system; and sending a second temperature command, by the electronic controller, to the second environmental control system to adjust a temperature of a second air inflow into the second zone of the cabin based on the surface temperatures of the passengers within the second zone sensed by the at least one cabin occupancy sensor.

13. The method of claim 11, further comprising:

sensing, by the at least one cabin occupancy sensor, a number of empty seats within the second zone of the cabin of the aircraft;

communicating data representative of the number of empty seats within the second zone from the at least one cabin occupancy sensor to the electronic controller, wherein the electronic controller is in communication with a second cabin air circulation system; and sending a second flow command, by the electronic controller, to the second cabin air circulation system to adjust a rate of the second air inflow into the second zone of the cabin based on the number of empty seats in the second zone sensed by the at least one cabin occupancy sensor.

14. The method of claim 13, further comprising:

adjusting a speed of a first recirculation fan of the first cabin air circulation system in response to the first flow command from the electronic controller.

15. The method of claim 14, further comprising:

adjusting a speed of a second recirculation fan of the second cabin air circulation system in response to the second flow command from the electronic controller.

* * * * *